March 29, 1966 C. P. GERMANO 3,243,614

STEREOPHONIC RECORD TRANSDUCERS

Filed Dec. 29, 1958

*INVENTOR.*
CARMEN P. GERMANO

*BY* Francis L. Masselle

ATTORNEY

United States Patent Office 3,243,614

Patented Mar. 29, 1966

3,243,614

STEREOPHONIC RECORD TRANSDUCERS

Carmen P. Germano, South Euclid, Ohio, assignor to Clevite Corporation, Cleveland, Ohio, a corporation of Ohio Filed Dec. 29, 1958, Ser. No. 783,483
4 Claims. (Cl. 310—8.6)

Figure 1:
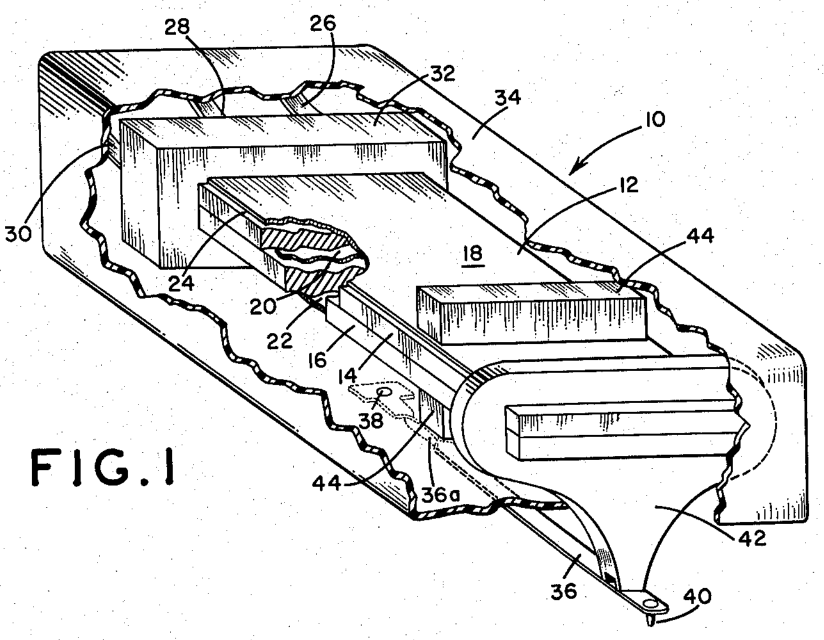

This invention relates to electromechanical transducers and, more particularly, to transducers for stereophonic recording and/or reproduction of sound on record disks.

As used herein the term "electromechanical transducer" denotes a device for translating or converting between electrical and mechanical forms of energy, without regard for the direction of conversion. Thus, while the invention will be described and illustrated as applied to a phonograph pickup, wherein the conversion is from mechanical to electrical, it is also applicable in principle to the correlative device—a record cutter—in which case the energy conversion is from electrical to mechanical. The term "record transducer" shall be employed generically herein to designate both types of devices.

This application is a continuation-in-part of Serial No. 684,096, filed September 16, 1957.

The principles and advantages of "binaural" or "stereophonic" sound recording and reproduction systems are well-known in the art. Until recently the practical, commercial realization of such systems has been limited to the use of recordings on electromagnetic tape. The high cost of duplicating pre-recorded magnetic tape recordings, and the expense of satisfactory equipment for sound reproduction from tape has prevented a significant growth in popularity of stereophonic recording.

It has been proposed to make binaural disk recordings by simultaneously recording in a single groove two stereophonically related sound tracks or channels by using a single cutting stylus driven by two transducers each fed with a respective input signal. One channel would be recorded as a vertical (i.e., "hill and dale") track and the other as the more conventional lateral track. Such recordings would be played back with a stylus driving two transducers coupled to separate amplifier and speaker systems.

It is a fundamental general object of the present invention to provide improved and practical binaural phonograph record cutters and pickups.

A more particular object is the provision of binaural photograph record cutters and pickups which require and employ but a single transducer element, and, consequently, are no bulkier, heavier nor costlier than monaural devices of comparable quality.

Another important object of the invention is the provision of novel stereophonic record transducers which provide satisfactory channel separation and relatively flat response over the entire range of audio frequencies.

Still another object is the provision of novel stereophonic phonograph pickup devices which may be fabricated in a physical configuration substantially identical to existing monaural devices and, consequently, can serve as replacements therefor in conversion of existing equipment to stereophonic operation.

A further object is the provision of a novel stereophonic pickup which is operative to reproduce binaural or monaural recordings.

A still further object is the provision of novel stereophonic phonograph pickup devices characterized by substantially equal output signals in both channels.

These and further objects of the invention are accomplished by record transducers according to the invention which comprise a plate of electromechanically active material responsive in the face shear mode and a plate of electromechanically active material responsive in an extensional mode. The plates are superposed and mechanically coupled with a respective major face in confronting relation; and provided operative electrode means forming opposed electrode pairs on each of said plates. Mechanical coupling means is provided motion of which in one fashion is associated with a flexural distortion of said plates and in another fashion is associated with torsional distortion of said plates. Individual electrical connections to each electrode pair are provided.

In accordance with another feature of the invention, a phonograph pickup comprises a unitary electromechanical transducer element responsive in the flexural and torsional modes, the efficiency of the torsional mode being greater and the response in both modes being inversely related to the free length of the element. Mechanical coupling means is provided adjacent one end of the element motion of which in one fashion is associated with flexural distortion of the element and in another fashion is associated with torsional distortion of the element. Mounting means at the other end of the element supporting it in cantilever fashion and are adapted to decrease the effective free length of the element in the flexural mode only and thus compensate for the disparity in the efficiencies of the modes.

Figure 2:
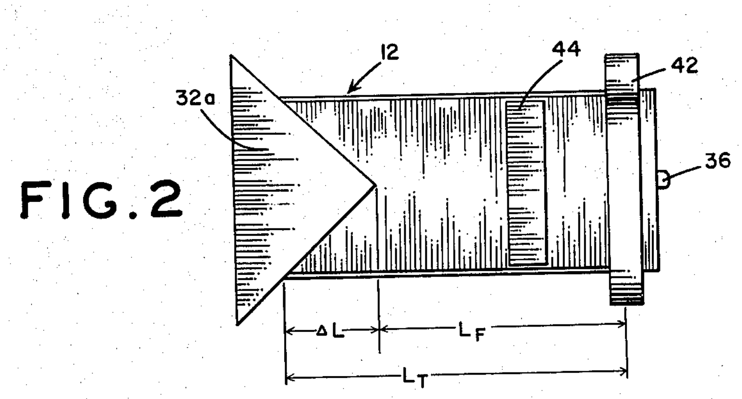
Figure 3:
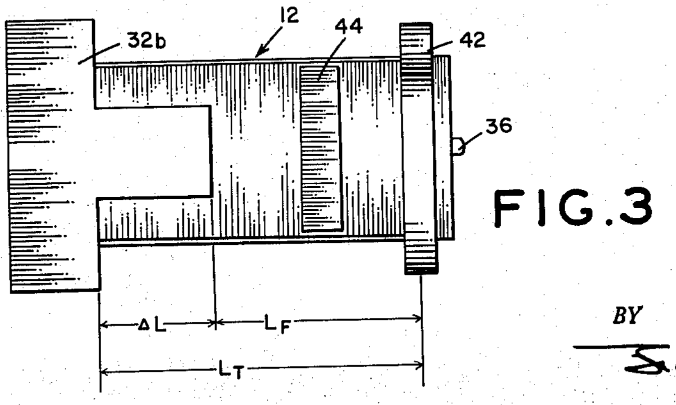

Additional objects of the invention, its advantages, scope and the manner in which it may be practiced will be apparent to those conversant with the art from the following description and subjoined claims taken in conjunction with the annexed drawings in which:

FIGURE 1 is a perspective elevational view, with parts broken away, illustrating a phonograph pickup embodying the present invention; and FIGURES 2 and 3 are top plan views of a phonograph pickup showing particular details of the invention.

Referring now to the drawings and, first, particularly to FIGURE 1, there is illustrated a phonograph pickup device designated generally by reference character 10 comprising a cantilever-mounted transducer element 12 hereinafter referred to as a "bender-twister" element.

Element 12 consists of a pair of plates 14 and 16 of electromechanically active material. One plate, 14 for example is a "length expander," i.e., it responds in an axial extensional mode. The other plate, 16, is a face shear plate.

Plates 14 and 16 are mechanically coupled in congruent superposition; this may be accomplished in any known and suitable manner such as cementing. Also in any known and suitable manner, an electrode is provided on the exposed major surface of each of plates 14 and 16 and another electrode is interposed between the confronting major surfaces of the plates. These electrodes are designated 18, 20 and 22; only electrode 18 appears substantially in its entirety but it will be understood that electrodes 20 and 22 are similar in configuration. Electrode 20 is common to both plates but may be formed of individual electrodes on the contiguous or mating surfaces of the plates.

Each electrode covers substantially the entire surface with which it is associated but, preferably, a narrow unelectroded margin such as 24 is provided. Suitable leads 26, 28 and 30 are provided for each of the electrodes 18, 20 and 22, respectively.

For additional details as to the construction and operation of bender-twister elements such as element 12, reference may be had to the aforementioned copending application Serial No. 684,096.

Bender-twister element 12 is mounted cantilever-fashion within housing 34, one end of bender-twister element 12 being suitably clamped in a mounting member 32 of rubber or similarly compliant material. Mounting member 32 is secured within one end of a housing or case 34 which may be of generally conventional design. A conventional cantilever-mounted stylus 36 has one end fixed, as by a screw fastener 38, to the underside of housing 34 or other relatively rigid structure of the cartridge. The other end of stylus 36 carries a suitable, conventional stylus point 40 which engages (or "tracks") in the record grooves. Intermediate its ends, stylus 36 has a section 36*a* which is twisted 90° relative to the remainder in order to provide both vertical and horizontal compliance.

Adjacent stylus point 40 the free end of stylus 36 is mechanically coupled, as by a yoke 42, to the free end of bender-twister element 12. In the illustrated embodiment, yoke 42 is in the general form of an inverted isosceles triangle having its apex portion fixedly secured to stylus 36 and its base portion clamping element 12. Yoke 42 is constructed and arranged (1) to transmit to element 12 substantially rectilinear reciprocatory motion of stylus point 40 so as to cause flexing of the element about a transverse axis, and (2) to transmit to element 12 torsional oscillatory motion about its longitudinal center line resulting from lateral movement of stylus point 40. Damping pads 44 are provided in the customary manner to control the amplitude of movement of element 12 to suppress resonances in the system. These pads preferably are highly compliant blocks disposed between element 12 and the top and bottom surfaces of housing 34.

Leads 26, 28 and 30 extend through housing 34 for connection to suitable stereophonic audio amplification system. In a stereophonic system, two separate amplifier and speaker systems (not shown) are employed, and the output between lead 26 and common lead 28 would be fed to one system and the output between the common lead and lead 30 would be fed to the other.

An understanding of the operation of record transducer 10, either as a pickup or a cutter, necessarily begins with an understanding of the functioning of element 12.

If element 12 is flexed about a transverse axis its component plates 14 and 16 will be stretched and compressed in a manner exactly analogous to the plates of a conventional bender bimorph and a voltage proportional to the bending moment appears across terminals 26 and 28 associated with length expander plate 14. Under these conditions no substantial output appears between terminals 28 and 30, associated with face shear plate 16 because neither flexural nor longitudinal stressing of such a plate gives a resultant output.

In a similar fashion, if the element 12 is twisted about its longitudinal axis the plates undergo a face shear deformation resulting in an output appearing between leads 28 and 30 of shear plate 16 while plate 14 gives no substantial output under these conditions.

From the foregoing description it will be seen that transducer element 12 has independent sensitivity to flexural and torsional displacement. It will be appreciated that the transducer action is reversible, i.e., an electrical signal applied to leads 26, 28 causes bending of the unit and a signal applied between leads 28, 30 causes twisting. While the bending and twisting actions have been described individually for the sake of simplicity, both actions can be operative simultaneously. Thus if a signal is applied between leads 26 and 28 and another between 28 and 30, the mechanical deformation of the element 12 is the resultant of the bending and twisting motions. The same is true of the transduction from mechanical to electrical energy, i.e., a bending force and a torque may be simultaneously applied to the element whereupon an electrical signal proportional to the flexure appears between leads 26, 28 and an electrical signal proportional to the torque will appear between leads 28, 30. This action is employed in binaural phonograph record cutters and pickups according to the present invention; thus the operation of pickup 10 is as follows:

In response to the hill-and-dale (or vertical) track of the record, stylus point 40 reciprocates in an approximately vertical linear path as permitted by the compliance of the stylus in a vertical plane. This vertical reciprocation of the stylus point is transmitted by yoke 42 to and causes corresponding flexural vibration of element 14 resulting in an output from length expander plate 14 which appears between leads 26 and 28. In response to the lateral (or horizontal) track of the record, stylus point 40 oscillates in a generally horizontal plane as permitted the horizontal compliance of the stylus. This causes yoke 42 to oscillate about the longitudinal center line of element 12 and transmit a torque to and cause corresponding twisting vibrations of the element. The twisting vibrations are reflected by an output from face shear plate 16 which appears between leads 28 and 30.

From the foregoing description it will be clear that pickup 10 can also be used to reproduce sound from monaural records of either the lateral or hill-and-dale variety. No adjustment or switching is necessary; the non-used channel simply remains inoperative.

It will be appreciated that, while a phonograph pickup has been described and is illustrated in FIGURE 1, the principles of the present invention are equally applicable, in all respects, to a record cutting head. The structural changes necessary to adapt the FIGURE 1 structure to the installation and use of a cutting stylus are not germane to the present invention.

While the pickup hereinabove described is entirely satisfactory for many applications, it can be improved as will now be explained.

The efficiency of a piezoelectric element is higher in the shear mode than in the expansional mode. Consequently, the output obtained from the lateral channel is higher than that derived from the hill-and-dale channel. This causes an unbalanced output requiring different volume adjustment of the audio amplifiers to compensate. One manner in which compensation of the difference in output can be accomplished is by making one of the plates thicker, i.e., the plate operating in the *more efficient* mode. Still another alternative is to make the plates of different length and/or width but from the standpoint of ease and economy of manufacture and maximum strength, it is desirable that the plates be dimensionally identical.

The preferred manner in which this unbalance can be eliminated makes use of the fact that the output of a displacement type pickup such as shown in FIGURE 1 is inversely proportional to the length of the plates 14 and 16. It is proposed therefore to limit the effective length of the low output plate (e.g., the expander) and thus increase its output without introducing any differential in the actual length of the plates which would complicate manufacture of the elements. The manner in which this is accomplished will now be described with reference to FIGURES 2 and 3.

FIGURE 2 illustrates in top plan view a pickup generally similar to that in FIGURE 1 but with the cartridge housing 34 omitted entirely. Parts common to FIGURES 1, 2 and 3 bear the same reference numerals and modified parts bear reference numerals with lower case letters appended.

In the pickup shown in FIGURE 2, the rear clamping pad 32*a* is formed in the shape of an isosceles triangle having its apex directed toward the stylus and symmetrically disposed with respect to the longitudinal center line of element 12. While it does not appear in FIGURE 2, it will be understood that the shape and location of pad 32*a* is the same on the underside of element 12.

Bearing in mind the operation of the pickup as hereinabove described, it will be appreciated that the effective length $L_F$ of element 12 in flexure is from the general region of the apex of pad 32*a* to yoke 42 whereas, in torsion, the effective length $L_T$ extends back to the general region of the point where the side edges of the element enter the clamping pad.

The difference, $\Delta L$, in effective length can be varied by adjustment of the altitude dimension of the triangular shape of pad 32*a*. The compliance of the material of pad 32*a* would also influence the effective length to a small degree, e.g., if a highly compliant material were employed, the apex portion of the pad would deflect somewhat more than with a stiffer material so that the effective length in flexure would be slightly greater. Another design parameter would be the relation between the width of the element and the base and altitude dimensions of the triangle. These factors, however, are for the most part comparatively trival in their effect and usually may be ignored.

The clamping pad may take the form of a T as exemplified by pad 32*b* in the FIGURE 3 embodiment. A wide variety of other shapes of clamping pads can be devised, the essential requirement being that that portion of the rear clamping pad in the region of the longitudinal centerline of the transducer element extend a greater distance toward the stylus-end of the element than the portions adjacent the side edges of the element. In other words, the effective or unclamped length of the element must be greater along its centerline than along its edges.

From the foregoing description it will be appreciated that the objects of the invention are accomplished by the device disclosed and claimed. The pickup is of the same size and outward physical configuration as a conventional (i.e. monaural) pickup and can easily be substituted thereof in conversion of existing equipment.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A stereophonic phonograph pickup comprising: a transducer element responsive in the flexural and torsional modes, the efficiency of the torsional mode being greater than that of the flexural mode and response in both modes being inversely related to the free length of said element; mechanical coupling means, adjacent the free end of said element, motion of which means in one fashion is associated with flexural distortion of the ele-element and in another fashion is associated with torsional distortion of the element; and mounting means at the other end of said element supporting it in cantilever fashion and adapted to decrease the effective free length of the element in the flexural mode only.

2. A stereophonic phonograph pickup element according to claim 1 wherein said mounting means comprises a body of compliant material clamping said other end, said body extending along the top and bottom surfaces of said element, toward said one end thereof, a greater distance at the longitudinal centerline of the element than at the side edges thereof.

3. A stereophonic phonograph pickup according to claim 2 wherein said body of compliant material generally is T shaped as viewed from above and below said element.

4. A stereophonic phonograph pickup element according to claim 2 wherein said body of compliant material is generally triangular in form as viewed from above and below said element.

References Cited by the Examiner

UNITED STATES PATENTS

| | | | |
|---|---|---|---|
| 2,439,499 | 4/1948 | Williams et al. | 179—100.41 |
| 2,444,590 | 7/1948 | Bokeny | 310—8.6 |
| 2,478,223 | 8/1949 | Argabrite | 310—9.7 |
| 2,699,470 | 1/1955 | Koren | 179—100.41 |
| 2,719,928 | 10/1955 | Baerwald | 179—100.41 |
| 2,775,460 | 12/1956 | Shivack | 179—100.41 |

ORIS L. RADER, *Primary Examiner.*

JAMES E. SAX, L. MILLER ANDRUS, *Examiners.*

A. J. ROSSI, J. R. GOUDEAU, P. C. FLATTERY, J. R. HOPKINS, *Assistant Examiners.*